(12) United States Patent
Van Der Zande et al.

(10) Patent No.: US 9,717,135 B2
(45) Date of Patent: Jul. 25, 2017

(54) ILLUMINATION SYSTEM, ILLUMINATION METHOD AND LIGHTING CONTROLLER

(71) Applicant: PHILIPS LIGHTING HOLDING B.V., Eindhoven (NL)

(72) Inventors: Bianca Maria Irma Van Der Zande, Heeze (NL); Peter Johannus Cornelis Sleegers, Malden (NL); Nienke Marcella Moolenaar, Utrecht (NL); Mirjam Galetzka, Enschede (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/934,546

(22) Filed: Nov. 6, 2015

(65) Prior Publication Data

US 2016/0066390 A1     Mar. 3, 2016

Related U.S. Application Data

(63) Continuation of application No. 13/877,663, filed as application No. PCT/IB2011/054364 on Oct. 4, 2011, now Pat. No. 9,271,374.

(30) Foreign Application Priority Data

Oct. 8, 2010  (EP) .................................... 10186990

(51) Int. Cl.
   *H05B 39/04*  (2006.01)
   *H05B 37/02*  (2006.01)

(52) U.S. Cl.
   CPC ........... *H05B 37/029* (2013.01); *H05B 37/02* (2013.01); *H05B 37/0227* (2013.01)

(58) Field of Classification Search
   CPC .................................................. H05B 37/029
   See application file for complete search history.

(56) References Cited

U.S. PATENT DOCUMENTS

| | | | |
|---|---|---|---|
| 2003/0107887 A1 | 6/2003 | Eberl | |
| 2004/0105264 A1* | 6/2004 | Spero | B60Q 1/04 362/276 |

(Continued)

FOREIGN PATENT DOCUMENTS

| | | |
|---|---|---|
| CN | 101586755 A | 11/2009 |
| GB | 2293443 A | 3/1996 |

(Continued)

*Primary Examiner* — Daniel Puentes

(57) ABSTRACT

The invention relates to an illumination system comprising a luminaire which is configured to provide light according to a plurality of preset combinations of illumination level and color temperature, controlled via a control protocol. The system further comprises a user interface comprising means to (manually) select the illumination level and color temperature from said plurality of preset combinations. The number of preset combinations is at least three. The control protocol comprises transition times for transitions between said preset combinations, said transition times being in the range of about 2 seconds to about 5 minutes. The invention further relates to an illumination method using the illumination system and to a controller uploaded with said preset lighting settings. The use of the system in dependence on the activity, time of day or atmosphere in the classroom has been proven to improve the learning behavior of children. It therefore is a learning tool for teachers.

4 Claims, 5 Drawing Sheets

(56) References Cited

U.S. PATENT DOCUMENTS

| | | |
|---|---|---|
| 2008/0136334 A1 | 6/2008 | Robinson et al. |
| 2010/0039043 A1 | 2/2010 | Wacknov et al. |
| 2010/0072904 A1 | 3/2010 | Eckel et al. |

FOREIGN PATENT DOCUMENTS

| | | |
|---|---|---|
| JP | 2013004278 A | 1/2003 |
| JP | 2009049000 A | 3/2009 |
| JP | 2010178151 A | 8/2010 |

* cited by examiner

ILLUMINATION SYSTEM, ILLUMINATION METHOD AND LIGHTING CONTROLLER

CROSS-REFERENCES TO RELATED APPLICATIONS

This application is a Continuation application of U.S. Ser. No. 13/877,663, filed on Apr. 4, 2013, which is the U.S. National Phase Patent Application of International Application No. PCT/IB2011/054364, filed on Oct. 4, 2011 and claims the benefit of European Patent Application No. 10186990.7, filed on Oct. 8, 2010. These applications are hereby incorporated by reference herein.

FIELD OF THE INVENTION

The invention relates to an illumination system comprising a luminaire and a user interface for providing dynamic light, using a plurality of preset lighting settings. The invention further relates to an illumination method using the illumination system. The invention yet further relates to a controller uploaded with said preset lighting settings.

BACKGROUND OF THE INVENTION

It is well known that light has a tremendous influence on human behavior. Research has verified that both natural and artificial lighting have an effect on people's emotions, behavior, well-being, mood, and performance. Empirical studies demonstrate said effect in various settings, such as retail environments, offices, counseling rooms in health care settings, home-like decors, and schools. Studies further indicate that there is a basic level of how people experience light as the most pleasant and that the preference for lighting is in part dependent on the situation, the task at hand, and the specific environment. The extent to which dynamic lighting in elementary schools affects children's emotions, well being and school outcomes has been an object of investigation as well.

The effect of lighting on school performance can play a vital role in the improvement of learning environments in schools. While educational research has provided valuable insights in the importance of various aspects of learning environments, such as learning tasks and materials, time on task, teachers' instructional behavior, and the relationship between teacher and student, systematic empirical research into the influence of physical aspects of students' learning environment, such as climate control, air quality, noise, use of color, and lighting remains scarce. Such studies are needed to provide increased understanding of the influence of these so-called ecological variables, and their interaction with educational process variables, such as instructional quality, on students' learning, behavior, and well-being.

SUMMARY OF THE INVENTION

It is an object of the invention to provide an illumination system of the type described in the opening paragraph for improving at least one of the performances selected from: concentration, motivation, appreciation, cognitive tasks and/or interpersonal human behavior. To this end, the illumination system comprises:

at least one luminaire which is configured to provide light according to a plurality of preset combinations of illumination level and color temperature, which color temperature and illumination level are controlled via a control protocol;

a user interface comprising means to (manually) select the illumination level and color temperature from said plurality of preset combinations, the plurality of preset combinations being at least three, the control protocol comprising transition times for transitions between said preset combinations, said transition times being in the range of about 2 seconds to about 5 minutes.

A research project was performed to substantiate recent findings of a study into the effect of dynamic lighting in schools. This project, wherein use is made of the above-mentioned lighting system, examined the effects on the concentration and behavior of students in elementary education, and investigated additional mechanisms that may explain the relationship between lighting and school performance, such as increased motivation, well-being, cooperative learning and appreciation of the environment. The findings of this project show that the dynamic lighting system has a positive effect on pupils' ability to concentrate and pupils' behavior in terms of restlessness and aggressive behavior. It was also found to improve enhancement and appreciation of the learning environment and school performance, as assessed by increased reading speed and reading comprehension. The use of the system, depending on the activity, time of day or atmosphere in the class, thus has proven to improve the learning behavior of children. It therefore is a learning tool for the teacher.

What was particularly surprising was the effect of the transition time, which appeared to cause a further improvement in the performance of cognitive tasks and interpersonal behavior when rightly set, i.e. in the range of 2 seconds to 5 minutes. In particular, a transition time shorter than 2 seconds appeared to be experienced as disturbing and likely to cause headaches after repetitive transitions, while a transition time of more than 5 minutes does not seem to give an additional advantage over shorter transition times. This is possibly explained by the effect that a change in environment activates our primary brain to become alert which is supported by blue enriched lighting for the moments that follow. The radiation received by the pupils brings about the production of hormones such as cortisol, formed when light in a relatively short wavelength range, for example blue light, for example light of a wavelength of about 460 nm, is received by the human body, for example through the eye, and melatonin which is formed when the light received by the human body is free from wavelengths of about 460 nm. Said hormones normally are formed in the human body and released in the blood within a few minutes after the specific radiation has been received.

The number of presets should be at least three to provide enough variation, as this results in six different possible transitions between the preset combinations, thus enabling the teacher to more specifically support children in the desired behavior for a certain task by means of the illumination system. Additionally, the presets should be chosen such that the supplied lighting condition interacts with the human body processes to bring about the desired emotion or alertness. That is to say, a warm calm preset is proven to stimulate cooperative behavior, and a feeling of safety, while blue-enriched stimulates communication and alertness as opposed to sleepiness and a high intensity setting stimulates concentration. The transition then is the first indicator initiated by the teacher to make the children alert by switching their behavior.

To further enhance the transition effect, preferably the transition times are in the range of about 3 seconds to about 10 seconds. These relatively short transition times are clearly noticed by the pupils/students and apparently induce an extra boost in the improvement in concentration, the performance of cognitive tasks and interpersonal behavior, however without said transitions being experienced as being disturbing and/or causing headaches resulting in an opposite, negative effect of the illumination system.

In the luminaire at least one light source is (to be) accommodated, for example a red, green, blue, amber, white LED combination or a number of fluorescent lamps, for example T5, TL, compact fluorescent lamps, or a number of HID lamps, for example a combination of CDM or metal halide HID lamps, each lamp having a specific color or color temperature and each lamp being individually controllable. Thus, the illumination system is enabled to provide the desired illumination level and color temperature by tuning the contribution of each individual lamp to the spectrum to be issued by the illumination system. Color temperature in this respect means that the spectrum issued by the illumination system has a color coordinate in the CIE 1931 color space diagram, which color coordinate is less than 0.025 units remote in x, and/or y-coordinate (=25 points), preferably less than 0.01 units (=10 points), from the black body locus as present in said CIE 1931 color space chromaticity diagram.

An embodiment of the illumination system is characterized in that in the three preset combinations at least the two following preset combinations are comprised:
calm setting in which the illumination level is at least 100 lux and the color temperature is about 2900K. This setting is intended to support tasks that incorporate aspects such as collaborative learning, and the development of social skills and creative skills;
standard setting in which the illumination level is at least 100 lux and the color temperature is about 3500K, i.e. in the range of 3000K to 4000K. This lighting setting is used at moments other than the other described learning situations;
and is further characterized in that at least one preset combination is comprised therein, chosen from the preset combinations:
energy setting in which the illumination level is about 650 lux and the color temperature is at least 9000K. This setting is intended for use at the start of the day and after lunch to activate the pupils. Due to the high color temperature and the relatively high lighting level, the alertness is improved via cortisol formation amongst others;
focus setting in which the illumination level is at least about 750 lux and the color temperature is about 6500K. This setting supports the children in their cognitive development for improving their sustained attention (concentration) via making them alert as well as supporting them in their visual performance of the task. In fact the task is highlighted. Moreover, sustained attention might be supported by the biological effects of light stimulating a cascade of hormone production.

It appeared that by using the possible combinations of these settings in the classroom, the teacher could better control the desired behavior of the pupils for a specific task. To even better control the desired behavior, the illumination system preferably comprises at least four preset combinations. Then, the illumination system has an even more positive effect on the improvement in concentration, motivation, appreciation, cooperative learning, communication, performance of cognitive tasks and interpersonal behavior of the pupils than with an illumination system with six or only two possible transitions.

A further expansion of the illumination system in the plurality of preset combinations comprises a fifth preset combination, for example a preset instruction combination, wherein the illumination is dimmed in front of, for example, a digital board to provide for more contrast and hence improved attention for the instruction. In said preset instruction combination the illumination level is less than 100 lux and the color temperature is less than 3000K. This enables the teacher to more specifically choose a desired setting for specific tasks, in this case in particular for giving an instruction according to which the pupils have to focus their attention on the digital board.

Lux is lumens per square meter; lumen or luminous flux is the luminous energy per time unit (second), and luminous energy (Qv) or quantity of light is given by the formula:

$$Qv = \int_{380}^{780} K(\lambda) Q_{e\lambda}\, d\lambda,$$

wherein
$\lambda$ is wavelength
$K(\lambda)$ lumen efficacy in lumen per watt at specific wavelength
$Q_{e\lambda}$ is radiant energy at specific wavelength.

An embodiment of the illumination system is characterized in that the illumination level in each preset combination is at least 300 lux, preferably at least 500 lux. The illumination level of at least 300 lux is sufficient for both teacher and pupils to perform writing and reading tasks without these tasks being too strenuous, thereby enabling the tasks to be performed during a relatively long period and yet not become too burdensome. The illumination level of at least 500 lux appeared to be particularly favorable in secondary school classes.

An embodiment of the illumination system is characterized in that it further comprises a lighting controller comprising a motion detector which is configured to automatically switch-over the illumination system to the calm setting upon detection of a level of motion that supersedes a preset motion threshold value. A method of measuring the level of motion consists in determining hyperactivity (agitation) by evaluation of changes in pixel values:

In the case of each pupil being adequately captured by a fish camera, being a 360° camera capable of detecting movement, an area of measurement around the head of the pupil is specified and movement during standardized mathematics tasks is measured.

The measurement data is corrected for the distance between the pupil and the camera, color distortions and the absolute number of pupils.

The preset motion level can be set by the teacher, and alternatively the function can be turned off manually. If the function is turned on, this embodiment of the illumination system automatically acts in situations which are about to get out of hand and in which the teacher does seem to forget to interfere. Thus, escalation of undesired situations is counteracted. It is only activated for special activities; e.g. if an energy setting has been on for more than, for example, 15 minutes or 30 minutes, the increased alertness of children might convert to increased hyperactivity, causing teaching to be hampered.

An embodiment of the illumination system is characterized in that it further comprises a lighting controller configured to detect motion and/or non-modulated light. Daylight and candle light are forms of non-modulated light. This lighting controller, for example a sensor, preferably has a response time in between 10-15 minutes. A shorter response time might result in undesired, untimely, automatic turning off of the lights, while a longer response time is less beneficial in terms of energy saving.

An embodiment of the illumination system is characterized in that the control protocol is selected from the group of standard protocols DALI, ZIGBEE, DMX, etc. . . The advantage of these protocols is that they are generally accepted standard protocols within lighting systems and very well adapted for the desired manual control of the preset combinations and transitions.

An embodiment of the illumination system is characterized in that it further comprises at least one additional motion sensor. This is particularly advantageous when the main sensor cannot cover the whole classroom, for example for large classrooms, classrooms having deviating shapes and pillars in the room, or classrooms that have multiple entry points.

An embodiment of the illumination system is characterized in that the illumination system simultaneously provides a plurality of preset combinations, such that for each activity space in one room there is a respective, independently controlled preset combination. This illumination system has the advantage that if different groups of pupils are present in one room, each group of pupils can be provided with its own specific preset combination that is best suited for the task to be done by that respective group of pupils.

The invention further relates to an illumination method using at least one luminaire, a user interface, a control protocol, and at least three preset combinations of illumination level and color temperature, the method comprising the steps of:

I—providing light according to a selected preset combination of illumination level and color temperature, which selected preset combination is maintained during at least 1 minute;

II—performing a transition from the preset combination to a selected further preset combination during a transition time in the range of 2 seconds to 5 minutes;

III—maintaining said further preset combination during at least 1 minute;

IV—performing at least one additional sequence of steps II and III.

The method allows manual control by the teacher in order to set a desired sequence of preset combinations and transitions (times), for example beneficial in class rooms and psychological institutes, but alternatively, can be applied in an automatic mode to follow a preset sequence of preset combinations and transitions, which for example is favorable in a social workplace or children's crèche. Though the time of 1 minute to maintain a specific setting seems short, it has been found to have the desired effect. This can be attributed to the supplied lighting condition interacting with the human body processes to provide for the desired emotion or alertness. That is to say, a warm calm preset is proven to stimulate cooperative behavior and a feeling of safety, while blue-enriched stimulates communication and alertness as opposed to sleepiness, and a high intensity setting stimulates concentration. Here, the transition is the first indicator initiated by the teacher to make the children alert by switching their behavior. However, for a more balanced use of the illumination system, the time to maintain a specific setting preferably is at least three minutes or at least five minutes. To avoid the number of transitions being relatively low, the longest time to maintain a specific setting should be at the most four hours, preferably at the most two hours or less.

Preferably, the illumination method is characterized in that the transition time is in the range of 3 to 10 seconds, to further emphasize the transitions, which then are clearly observable/noticeable and which promote the desired effects.

The invention still further relates to a lighting controller comprised in the illumination system and/or for use in the method. The lighting controller is uploaded with the preset combinations and the transition times.

BRIEF DESCRIPTION OF THE DRAWINGS

The invention will now be further elucidated by means of the schematic drawings in which.

DETAILED DESCRIPTION OF THE PREFERRED EMBODIMENTS

Figure 1:
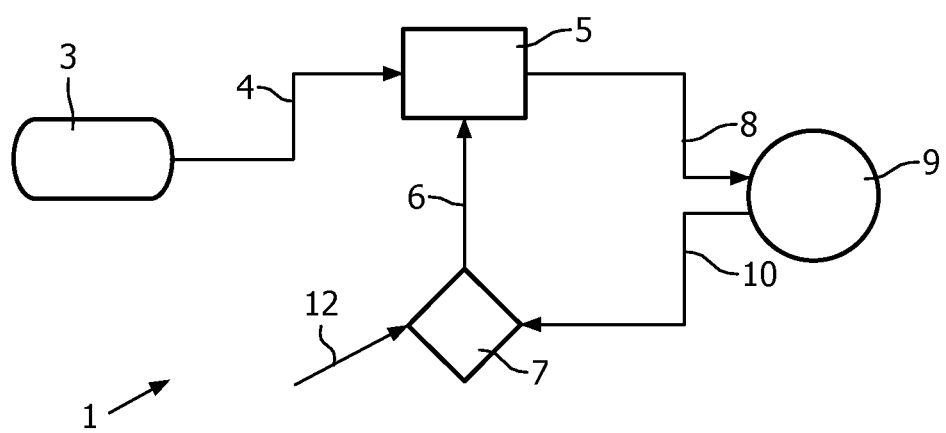
FIG. 1 shows a schematic representation of components of the illumination system according to the invention.

FIG. 1 shows a schematic representation of an illumination system 1 according to the invention. The illumination system comprises a user interface 3, sending a control protocol signal 4, for example to select a preset combination or to set a threshold value for the level of motion, to a controller 5 which subsequently sends a light signal 8 to at least one luminaire 9. The light issued by the luminaire is used as feedback signal 10 and sensed by a sensor 7 which subsequently provides a sensed signal 6 to the controller. Additionally, it is possible that the sensor comprises a motion detector that acts on an external motion level signal 12.

Figure 2:
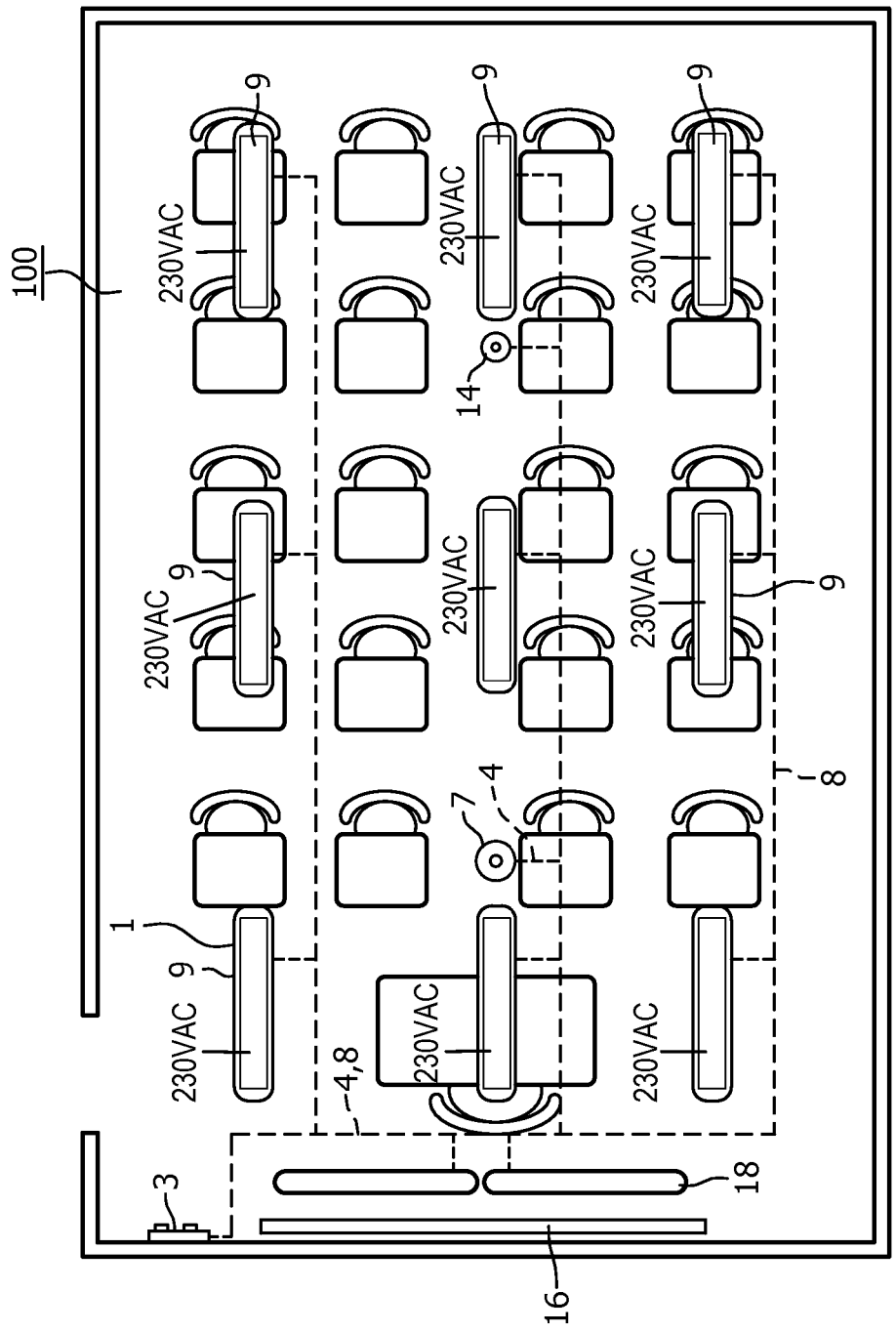
FIG. 2 shows a schematic view of a classroom with an installed illumination system according to the invention.

FIG. 2 shows a schematic view of a classroom 100 with an installed illumination system 1 according to the invention. The illumination system comprises a user interface 3, communicating with a plurality of luminaires 9, a sensor 7 and an additional motion sensor 14 communicating with one another via a DALI protocol 4, 8. The illumination system further comprises at least one additional luminaire 18 for providing a preset instruction combination, wherein the illumination is dimmed near a digital board 16 and wherein the illumination level is less than 100 lux and the color temperature is less than 3000K.

Figure 3:
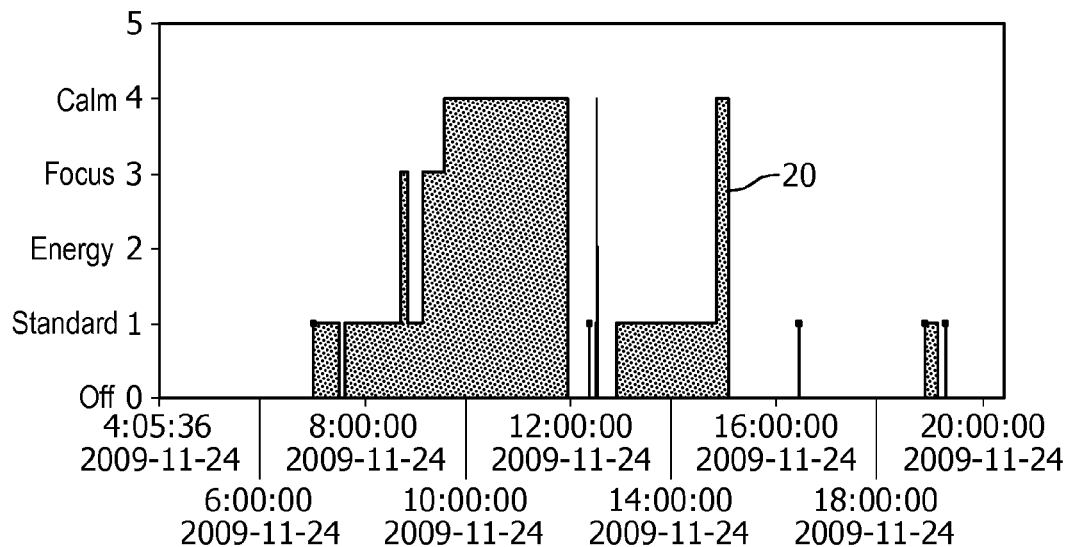
FIG. 3 shows a diagram of the usage of the illumination system of the invention during one day.

FIG. 3 shows a diagram 20 of an example of the use of the illumination system of the invention during one day, further indicated as "light program". Average use of the light program indicated that in the case of average use the 'standard' setting is used most often, i.e. between 50 and 80% of the time. The 'energy' setting is used only in 3 to 4% of the time. The rest of the time the teacher varies between the 'calm' setting and the 'focus' setting. The light program was used during the winter period in groups 6 and 8 of an elementary school during over 70 days with two teachers and about 20 to 25 pupils per class. In the illumination system, Philips TCS770 with 3× TL5-49W/452/827/452 25/90/25 Electronic PC-MLO ND luminaires were used.

FIGS. 4A-4D show diagrams on arbitrary scales of test results of investigated groups subjected to a light program, applied in classrooms. Different aspects were measured and evaluated. To assess the motivation of the pupils, an instrument was used that has been validated in the context of Dutch elementary education. The instrument consists of four scales that were developed in a study by Midgley and colleagues (2000) and Pintrich and De Groot (1990). In this study, four types of motivation were included; namely self-efficacy, mastery, performance-avoidance orientation, and performance-approach orientation. In order to facilitate interpretation of the items, the items concerning motivation for mathematics were focused on. The scale of the motivation items ranges from 1 (disagree) to 4 (agree). A composite score for each pupil was calculated that consisted of the average score for each of the four scales. Motivation as such refers to a combination of feelings of confidence, ability, (a lack of) fear of failure, and a willingness with respect to learning mathematics. The scales, origin, and items for the measurement of motivation are described in Table 1.

TABLE 1

Motivation scales, items and origin

| Scale | Based on | Items |
|---|---|---|
| Self-efficacy | Pintrich & De Groot (1990) | If I work hard, I can do even the most difficult math assignments<br>I expect to do very well in math this year<br>I am sure I can do an excellent job dealing with the math problems and tasks assigned for this class<br>I know that I will be able to learn the math material for this class |
| Mastery | Midgley et al. (2000) | It is important to me to understand the math assignments<br>I prefer challenging math assignments so I can learn something new<br>With math, I like to learn something that I find important<br>I try extra hard when I don't understand a math assignment<br>I like learning something new with math |
| Performance approach orientation | Midgley et al. (2000) | When I have to do a math assignment, I always start immediately<br>I work hard during a math lesson<br>I put much effort in my math classes<br>I can work for a long time on math problems |
| Performance-avoidance orientation | Midgley et al. (2000) | I don't like it when my classmates notice that I make a mistake in math<br>I don't like it when classmates finish more math assignments than I do<br>I am embarrassed when I have to ask for help in math<br>When I cannot finish an assignment quickly, I don't like it that my classmates see this. |

The effect of the light program on the motivation of children is not observed in the short term but in the longer term. This increase in motivation observed in the longer term is thought to be the result of children feeling more confident in doing tasks in a more appreciated environment. Or, in the words of children, it is not so boring anymore and the test is found less difficult. Motivation consists of various parameters, such as for example self efficacy, mastery, avoidance and goal approach.

Figure 4A:
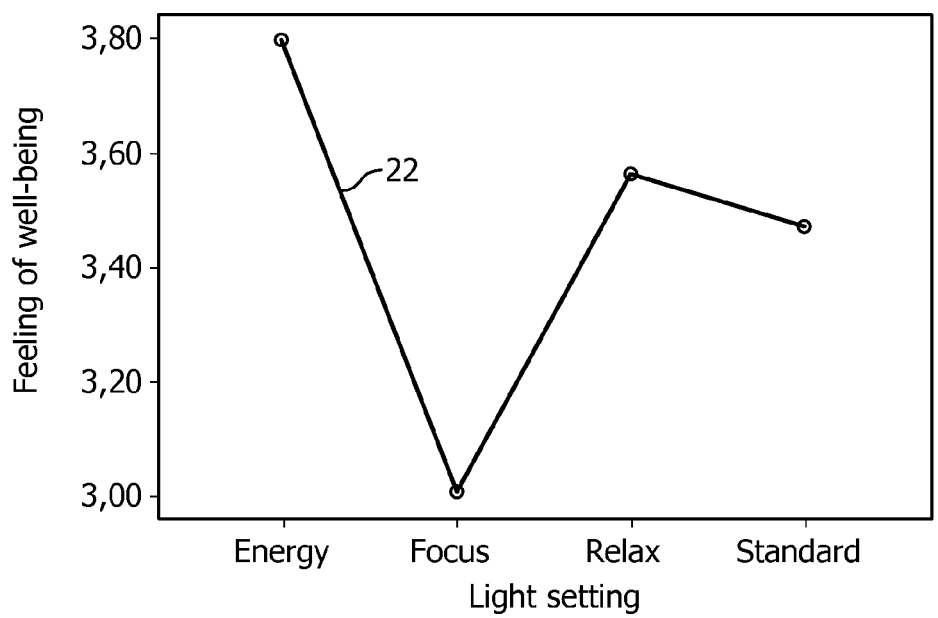
FIGS. 4A-4D show diagrams of the effect of the dynamic illumination system on a number of different behaviors.

In FIG. 4A, the settings 'calm' and 'energy' promote the feeling of well-being within the group as is shown by graph line 22. Well being was measured by means of 10 items (based on KIDSCREEN-10, Erhart et al., 2009). Sample items include: At home and at school . . . "I feel fit and well", "I feel full of energy", and "I get on well at school"' (1=totally disagree, 4=totally agree).

Figure 4B:
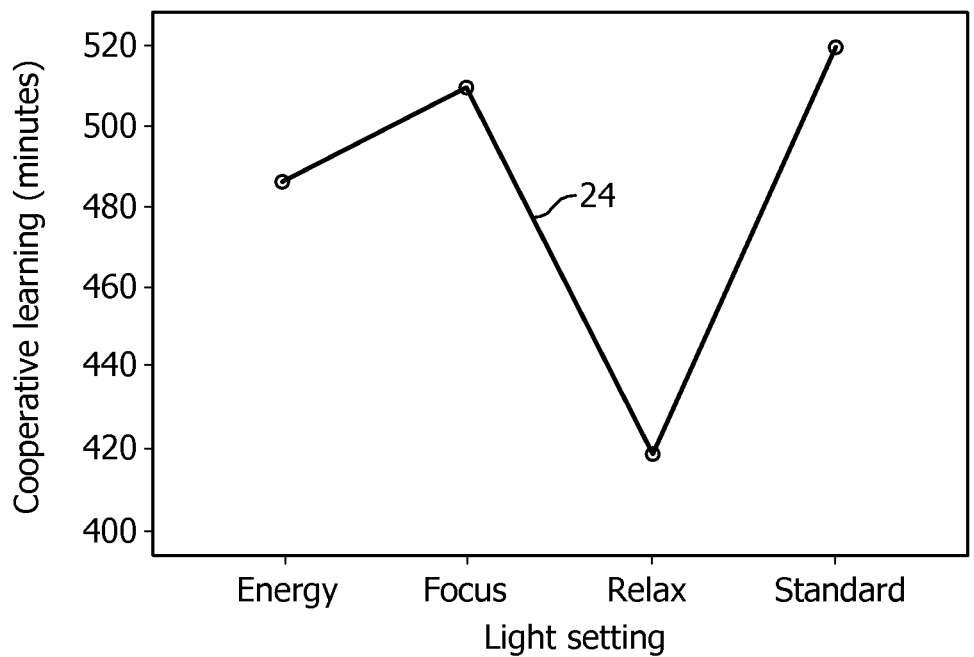

In FIG. 4B, the setting 'calm' improves cooperative learning; it appears that the children quicker solve puzzles which require teamwork. In small heterogeneous teams of 2 to 6 children (dependent on the total number of children in the session), the children performed a cooperative learning task developed by Slavin (1995). The teams had to solve five jigsaws. To assess the cooperative learning achievement, the time the teams needed to solve the jigsaws, plotted along the Y-axis, was measured and is shown by graph line 24.

Figure 4C:
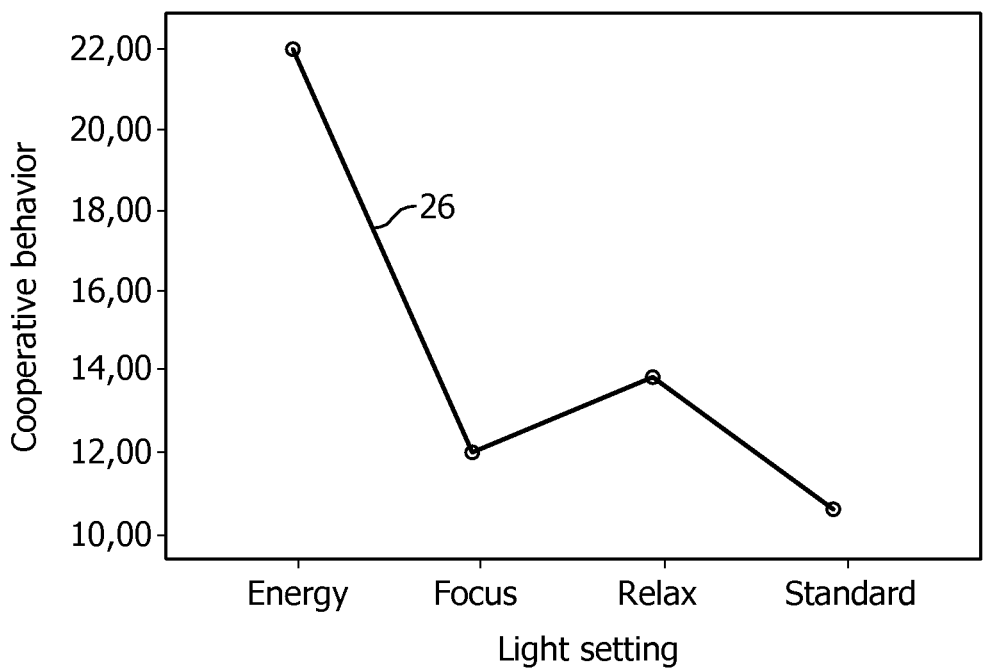

In FIG. 4C, the light program positively affects the social behavior of children; the children appear to be more communicative. To assess cooperative behavior displayed by each child, use was made of an observational rating scale that was based on The Oregon Preschool Test of Interpersonal Cooperation (OPTIC) developed by Paulson (1974). The adapted version of OPTIC consists of five levels of cooperative behavior. These levels include full cooperation (5 points), pre cooperation (5 points), active interaction (4 points), parallel play (3 points), watching (2 points), minimal interaction (1 point) and disruptive interaction (0 points). The average score was used to measure cooperative behavior and was plotted in the diagram by means of graph line 26.

Figure 4D:
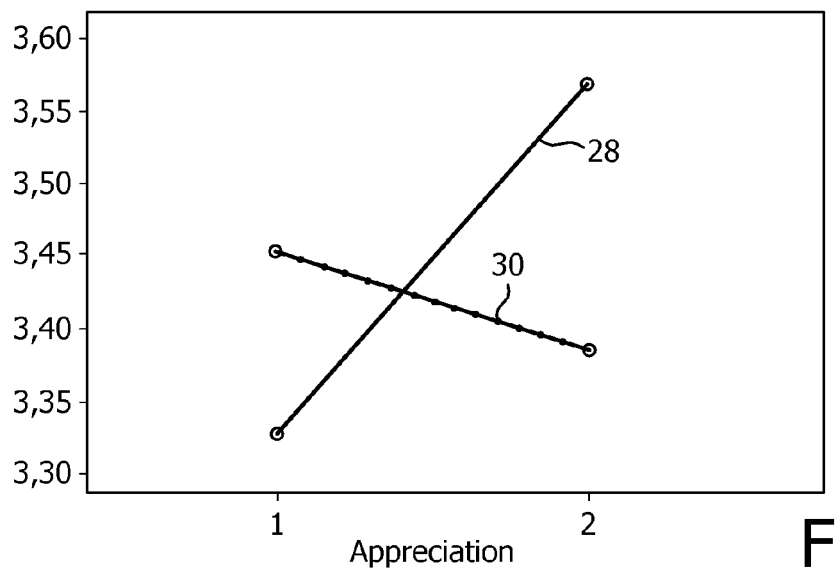

In FIG. 4D, the light program results in an about 7% higher appreciation of the (environment of the) school in the long term for the investigated group (solid line 28) and shows a small decrease for the control group (dotted line 30). Appreciation is linked to feeling safe and well being of children, which reduces stress and will lead to a better performance and lower drop-out rates. Thus, an improvement in appreciation is of relevance to the stakeholders in education. The combination of a laboratory study and a field study revealed that the use of the system and the changing environment is essential in reaching this result. Exposing children to only one lighting setting did not lead to significant changes in appreciation of the environment. The extent to which pupils appreciate their classroom, using 9 items, was studied as well. The items can be answered using a scale from 1 (disagree) to 4 (agree). The items used to assess pupils' appreciation of their environment are presented in Table 2.

TABLE 2

Appreciation scale, items, and origin.

| | | |
|---|---|---|
| Appreciation | Peetsma, De Kat, and Thoonen? | The classroom feels cosy<br>The classroom is comfortable<br>The ambience in the classroom is unpleasant (reversed)<br>I feel at ease in the classroom<br>There is a nice ambience in the classroom<br>I find the classroom depressing (reversed)<br>I think the classroom looks nice<br>The classroom is boring (reversed)<br>I feel good in the classroom |

Apart from the above specific results, as a general result the effect of the light program on the concentration was determined and was found to have a positive influence on the concentration. The concentration increased by about 18%. The increase in concentration is achieved by a light setting that has a higher intensity and color temperature than the standard setting and should be at least 750 lux. The combination of a laboratory study and a field study revealed that the use of the system and the changing environment is also essential in reaching this result. Exposing children to only one lighting setting did not lead to significant changes in concentration.

Figure 5:
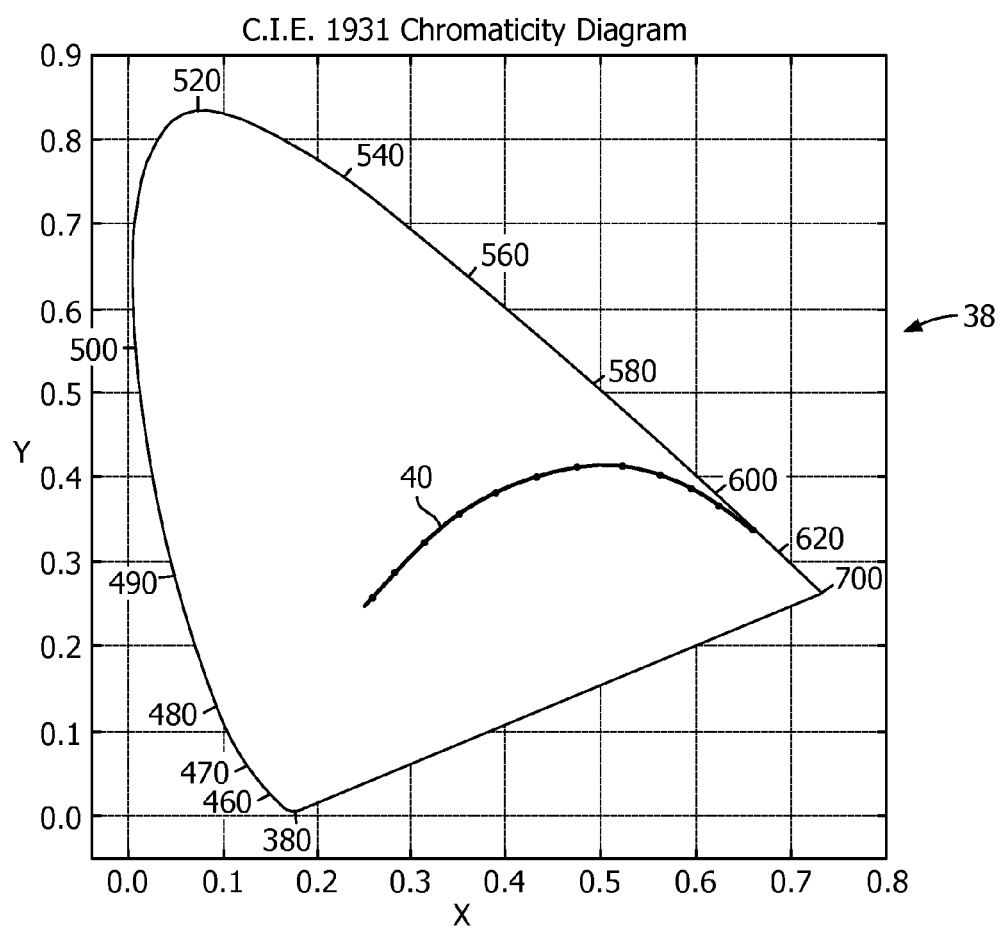
FIG. 5 shows the CIE 1931 color space chromaticity diagram together with the black body locus.

FIG. 5 shows the CIE 1931 color space chromaticity diagram 38 including the black body locus 40 according to which the color temperature is indicated. Spectra having color coordinates on the black body locus are generally seen as white light. In general, a human cannot distinguish between colors whose x- and y-coordinates differ less than 5 points (is 0.005 units in exact x- and y-coordinate). Color temperature applies to white light, and in this respect means that the spectrum issued by the illumination system has a color coordinate that is less than 0.025 units remote in x- and/or y-coordinate (=25 points), preferably less than 0.01 units (=10 points), from the black body locus as present in the CIE 1931 color space chromaticity diagram.

The invention claimed is:

1. An illumination system comprising:
   at least one luminaire which is configured to provide light according to a plurality of at least three preset combinations of non-zero illumination level and color temperature;
   a user interface configured to select the illumination level and color temperature from said plurality of preset combinations; and
   a lighting controller comprising a motion detector which is configured to automatically switch-over the illumination system from one of said preset combinations to another one of said preset combinations in response to detection of a level of motion that supersedes a preset motion threshold value, wherein said color temperature and said illumination level are automatically controlled via a control protocol, the control protocol comprising a preset sequence of preset transition times for transitions between said preset combinations, said transition times being in the range of about 2 seconds to about 5 minutes.

2. The illumination system according to claim 1, wherein at least one combination of said plurality of preset combinations is a calm setting in which the illumination level is at least 100 lux and the color temperature is about 2900K.

3. The illumination system according to claim 2, wherein said motion detector is configured to automatically switch-over the illumination system to the calm setting in response to detection of the level of motion that supersedes the preset motion threshold value.

4. The illumination system according to claim 2, wherein said plurality of preset combinations includes at least one of a standard setting in which the illumination level is at least 100 lux and the color temperature is about 3500K, an energy setting in which the illumination level is about 650 lux and the color temperature is at least 9000K, or a focus setting in which the illumination level is at least about 750 lux and the color temperature is about 6500K.

* * * * *